(12) United States Patent
Chen et al.

(10) Patent No.: US 7,060,390 B2
(45) Date of Patent: Jun. 13, 2006

(54) LITHIUM ION BATTERY COMPRISING NANOMATERIALS

(75) Inventors: Ga-Lane Chen, Fremont, CA (US); Charles Leu, Fremont, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 324 days.

(21) Appl. No.: 10/404,467

(22) Filed: Mar. 31, 2003

(65) Prior Publication Data

US 2004/0131937 A1    Jul. 8, 2004

(30) Foreign Application Priority Data

Jan. 6, 2003    (TW) .............................. 92100154 A

(51) Int. Cl.
*H01M 4/58*    (2006.01)
(52) U.S. Cl. .............................. 429/231.8; 429/231.4; 429/233; 423/447.1; 423/445 R; 423/594.4; 423/594.6
(58) Field of Classification Search ............ 429/231.3, 429/223, 231.8, 231.4, 233; 423/447.1, 445 R, 423/594.4, 594.6
See application file for complete search history.

(56) References Cited

U.S. PATENT DOCUMENTS

| | | | |
|---|---|---|---|
| 6,280,697 B1 * | 8/2001 | Zhou et al. ............... | 429/231.8 |
| 6,749,648 B1 * | 6/2004 | Kumar et al. ............. | 429/231.3 |
| 2003/0054249 A1 * | 3/2003 | Yamamoto et al. ....... | 429/231.1 |
| 2003/0147801 A1 * | 8/2003 | Someya et al. ........... | 423/447.3 |

OTHER PUBLICATIONS

Frackowiak et al. "Electrochemical storage of lithium multiwalled carbon nanotubes" Pergamon, Carbon 37, (1999), pp. 61-69.*
Sang-Cheol Han et al. "Effect of Multiwalled Carbon Nanotubes on Electrochemical Properties of Lithium/Sulfur Rechargeable Batteries"; Journal of The Electrochemical Society, 150 (7), Jul. 1, 2003, pp. A889-A893.*
Jae-hee Han et al. "Growth and emission characteristics of vertically well-aligned carbon nanotubes grown on glass substrate by hot filament plasma-enhanced chemical vapor deposition"; Journal of Applied Physics, 88 (12), Dec. 15, 2000, pp. 7363-7365.*

* cited by examiner

*Primary Examiner*—Laura Weiner
(74) *Attorney, Agent, or Firm*—Wei Te Chung

(57) ABSTRACT

A lithium ion battery includes a cathode (10) having a plurality of nanoparticles of lithium doped transition metal alloy oxides represented by the formula $Li_xCo_yNi_zO_2$, an anode (20) having at least one carbon nanotube array (22), an electrolyte, and a membrane (30) separating the anode from the cathode. The carbon nanotube array includes a plurality of multi-walled carbon nanotubes (23). Preferably, an average diameter of an outermost wall of the multi-walled carbon nanotubes is in the range from 10 to 100 nanometers, and a pitch between adjacent multi-walled carbon nanotubes is in the range from 20 to 500 nanometers. In the carbon nanotube array, the lithium ions are able to intercalate not only inside the multi-walled carbon nanotubes, but also in the interstices between adjacent multi-walled carbon nanotubes. Thus a density of intercalation of the carbon nanotube array is significantly higher than that of graphite.

4 Claims, 1 Drawing Sheet

LITHIUM ION BATTERY COMPRISING NANOMATERIALS

BACKGROUND OF THE INVENTION

1. Field of the Invention

The present invention relates to lithium ion batteries, and more particularly to lithium ion batteries comprising nanomaterials.

2. Description of Prior Art

Lithium ion batteries are popularly used because of their high capacity and environmentally friendly features. These batteries are becoming of increasing importance for a wide variety of uses, ranging from portable electronics to power supply devices for spacecraft. There is an ongoing need for advanced lithium ion batteries with higher capacity.

A conventional lithium ion battery comprises an anode, a cathode, an electrolyte, and a membrane. The membrane separates the anode from the cathode. The membrane is porous, allowing ions to pass therethrough while blocking electrons from passing therethrough. The membrane can be made from polyethylene, polypropylene or polystyrene. The cathode is generally made of lithium (Li) doped transition metal oxides such as $LiMO_2$ (M=cobalt, nickel or manganese) that function as electron donors. Atoms of the electron donor undergo an oxidation reaction to form ions of lithium, and free electrons. These ions travel through the membrane and are absorbed by the anode by a reduction reaction, and the free electrons travel through an electrical circuit to provide electrical current. The anode is generally made of materials comprising carbon, such as graphite or carbon fibers. The carbon materials can readily intercalate lithium ions. Since the number of electrons "given away" by each atom of the electron donor is known, by measuring the number of electrons transferred through the electrical circuit, the number of ions transferred can be determined. This quantity is related to the specific capacity of the battery, which can be expressed in milliampere-hours per gram of the material. For example, the maximum specific (reversible) capacity of graphite to accept lithium ions is reported to be approximately 372 mAh/g, characterized as ($LiC_6$) in an article by J. R. Dahn et al. entitled "Mechanisms for Lithium Insertion in Carbonaceous Materials" (Science, Volume 270, Oct. 27, 1995).

Other carbonaceous materials are used as electrodes in advanced lithium ion batteries. Carbon nanotubes are considered to be promising candidates for electrode materials. These nanotubes can be visualized as "rolled-up" sheets of carbon hexagons, providing a superior intercalation medium for lithium ion batteries. The intercalation capacity of single-walled carbon nanotubes has been reported by Jijun Zhao et al. in an article entitled "First-Principles Study of Li-Intercalated Carbon Nanotube Ropes" (Physical Review Letters, Vol. 85, P1706~1709, 2000). Results of the study show that, energetically, the insides of carbon nanotubes are as favorable as interstitial sites between carbon nanotubes for intercalation of lithium ions, and that the intercalation potential of single-walled carbon nanotubes is similar to that of graphite. Further, the density of the intercalated lithium ions in single-walled carbon nanotubes is higher than that in graphite, being up to about $Li_{0.5}C$.

U.S. Pat. No. 6,280,697 discloses a lithium ion battery employing single-walled carbon nanotubes as an electrode, and a method for making the electrode. The method comprises the following steps: preparing single-walled carbon nanotubes by laser ablation; washing and purifying the single-walled carbon nanotubes to obtain a purified material containing over 80% by volume of single-walled carbon nanotubes; placing the purified carbon nanotubes in a suitable solvent to form a solution; immersing a suitable substrate in the solution to deposit a film having the single-walled carbon nanotubes therein on the substrate; and driving off the solvent to leave the film of the single-walled carbon nanotubes covering at least an upper swface of the substrate and to promote adhesion of the film to the substrate. The substrate with the single-walled carbon nanotubes deposited thereon can then be used as an electrode of a lithium ion battery. However, the laser ablation method does not provide for satisfactory control of the diameter, length or direction of growth of the single-walled carbon nanotubes formed, and the yield of this method is relatively low. Moreover, excess amorphous carbon nanoparticles and metal catalysts are produced along with the single-walled carbon nanotubes, thus necessitating complicated purification processes. In summary, industrial production of single-walled carbon nanotubes using this method is problematic, and the capacity of the lithium ion battery employing the single-walled carbon nanotubes as electrodes formed by this method is limited.

SUMMARY OF THE INVENTION

Accordingly, an object of the present invention is to provide a lithium ion battery comprising nanomaterials which has a high charge capacity.

Another object of the present invention is to provide a lithium ion battery comprising nanomaterials which is suitable for industrial-scale production.

In order to achieve the objects set out above, a lithium ion battery in accordance with a preferred embodiment of the present invention comprises a cathode comprising a plurality of nanoparticles of lithium doped transition metal alloy oxides represented by the formula $Li_xCo_yNi_zO_2$, an anode comprising at least one carbon nanotube array, an electrolyte, and a membrane separating the anode from the cathode. The nanoparticles of $Li_xCo_yNi_zO_2$ have an average diameter in the range from 10 to 100 nanometers. The carbon nanotube array is formed by chemical vapor deposition, and comprises a plurality of multi-walled carbon nanotubes substantially parallel to each other. Diameters, densities and lengths of the multi-walled carbon nanotubes can be controlled. Preferably, an average diameter of outermost walls of the multi-walled carbon nanotubes is in the range from 10 to 100 nanometers, and a pitch between any two adjacent multi-walled carbon nanotubes is in the range from 20 to 500 nanometers. Spaces inside the multi-walled carbon nanotubes are generally as favorable for intercalation of lithium ions as interstices between adjacent multi-walled carbon nanotubes, in terms of energy required. The intercalation potential of each multi-walled carbon nanotube is comparable to that of graphite. In the carbon nanotube array, the lithium ions are able to intercalate not only inside the multi-walled carbon nanotubes, but also in the interstices between adjacent multi-walled carbon nanotubes. Thus a density of intercalation of the carbon nanotube array is significantly higher than that of graphite.

Other objects, advantages and novel features of the present invention will become more apparent from the following detailed description when taken in conjunction with the accompanying drawings, in which:

DETAILED DESCRIPTION OF PREFERRED EMBODIMENTS OF THE INVENTION

Figure 1:
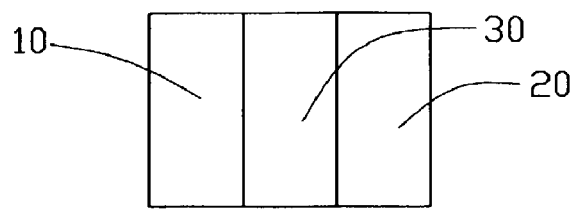
FIG. 1 is a schematic, side elevation view of a lithium ion battery in accordance with a preferred embodiment of the present invention.

Referring to FIG. 1, a lithium ion battery in accordance with a preferred embodiment of the present invention comprises a cathode 10, an anode 20, an electrolyte (not labeled), and a membrane 30 separating the cathode 10 from the anode 20.

The cathode 10 can be made of lithium doped transition metal oxides formed on a conductive substrate (not shown). In the preferred embodiment, the cathode comprises a plurality of nanoparticles of lithium doped transition metal alloy oxides represented by the formula $Li_xCo_yNi_zO_2$. An average diameter of the nanoparticles is in the range from 10 to 100 nanameters. The nanoparticles of $Li_xCo_yNi_zO_2$ can be prepared by sintering or another suitable method. A large surface area and high chemical activity of $Li_xCo_yNi_xO_z$ nanoparticles is favorable for intercalation of lithium ions therein.

The electrolyte comprises a solvent and solute. The solvent is preferably propylene carbonate, ethylene carbonate, or dimethyl carbonate. The solute is preferably lithium hexafluorophosphate ($LiPF_6$), lithium tetrafluoroborate ($LiBF_4$), or lithium perchiorate ($LiClO_4$). The membrane 30 deposited in the electrolyte separates the cathode 10 from the anode 20. The membrane 30 is porous, allowing ions to pass thereibrough while blocking electrons from passing therethrough. Generally, the membrane 30 is made of polyethylene, polypropylene or polystyrene.

Figure 2:
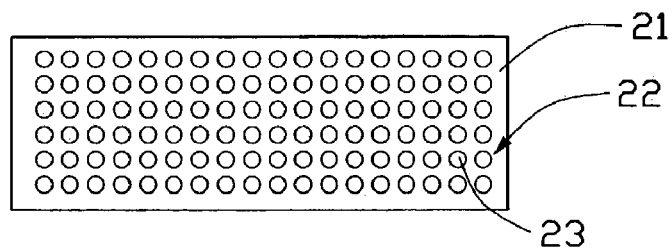
FIG. 2 is a schematic, enlarged view of an exemplary anode of the battery of FIG. 1.
Figure 3:
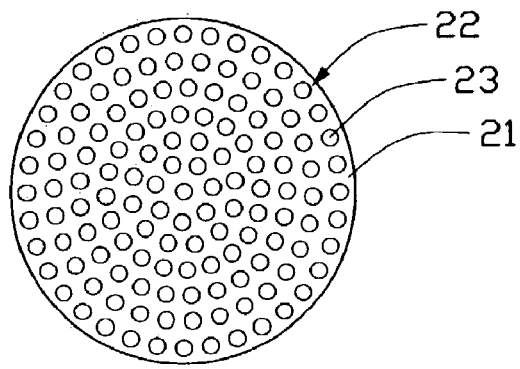
FIG. 3 is schematic, enlarged view of another exemplary anode of the battery of FIG. 1.
Figure 4:
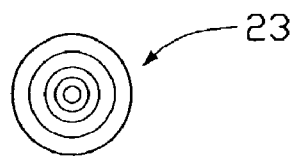
FIG. 4 is a schematic, enlarged end view of one multi-walled carbon nanotube of the anode of FIGS. 2 or 3.

Referring to FIGS. 2–3, the anode 20 comprises a conductive substrate 21 and at least one carbon nanotube array 22 formed thereon. Depending on a shape of the lithium ion battery, the conductive substrate 21 may be, for example, rectangular (FIG. 2) or circular (FIG. 3). The carbon nanotube array 22 is formed by transplanting pre-prepared carbon nanotubes onto the conductive substrate 21. The carbon nanotube array 22 comprises a plurality of multi-walled carbon nanotubes 23 substantially parallel to each other and perpendicular to the conductive substrate 21. Each multi-walled carbon nanotube 23 comprises a plurality of hollow coaxial tubes having different diameters (see FIG. 4). An average diameter of an outermost wall of the multi-walled carbon nanotubes 23 is in the range from 10 to 100 nanometers. A pitch (not labeled) between any two adjacent multi-walled carbon nanotubes 23 is in the range from 20 to 500 nanometers. The coaxial tubes of each multi-walled carbon nanotube 23 can be visualized as "rolled-up" sheets of carbon hexagons. Each sheet has a structure similar to that of graphite. Spaces inside the multi-walled carbon nanotubes 23 are generally as favorable for intercalation of lithium ions as interstices between adjacent multi-walled carbon nanotubes 23, in terms of energy required. The intercalation potential of each multi-walled carbon nanotube 23 is comparable to that of graphite. In the carbon nanotube array 22, the lithium ions are able to intercalate not only inside the multi-walled carbon nanotubes 23, but also in the interstices between adjacent multi-walled carbon nanotubes 23. Thus a density of intercalation of the carbon nanotube array 22 is significantly higher than that of graphite.

Figure 5:
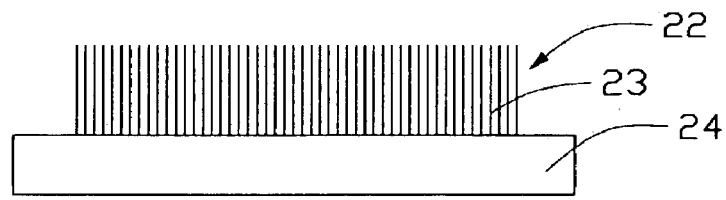
FIG. 5 is a schematic view of a carbon nanotube array formed on a substrate in accordance with the present invention.

Referring to FIG 5, the carbon nanotube array 22 is preferably formed on a substrate 24 by using chemical vapor deposition. The substrate 24 can be a silicon wafer. Generally, the method comprises the following steps: depositing a catalyst layer (not shown) on the substrate 24; annealing the substrate 24 with the catalyst layer thereon to form catalyst particles having nano-sized diameters (not shown); heating a reaction chamber up to a suitable temperature and introducing a carbon source gas to grow the carbon nanotube array 22 on the catalyst particles. Carbon nanotubes formed by chemical vapor deposition are mostly multi-walled carbon nanotubes 23. The multi-walled carbon nanotubes 23 are substantially parallel to each other and substantially perpendicular to the substrate 24. Diameters and densities of the catalyst particles, which can be controlled by annealing, determine diameters and densities of the multi-walled carbon nanotubes 23. A height of the carbon nanotube array 22 is controlled by a time of growing of the multi-walled carbon nanotubes 23. Generally, the height of the carbon nanotube array 22 can be up to several tens of micrometers or more.

It is understood that the invention may be embodied in other forms without departing from the spirit thereof. Thus, the present examples and embodiments are to be considered in all respects as illustrative and not restrictive, and the invention is not to be limited to the details given herein.

The invention claimed is:

1. An anode assembly for a lithium ion battery, the anode assembly comprising:
   a conductive substrate; and
   a plurality of multi-walled carbon nanotubes formed on the substrate, the multi-walled carbon nanotubes being substantially parallel to each other and substantially perpendicular to the substrate.

2. The anode assembly as described in claim 1, wherein an average diameter of an outermost wall of the multi-walled carbon nanotubes is in a range from 10 to 100 nanometers.

3. The anode assembly as described in claim 1, wherein a pitch between any two adjacent multi-walled carbon nanotubes is in a range from 20 to 500 nanometers.

4. The anode assembly as described in claim 1, wherein a plurality of lithium ions are intercalated not only inside the multi-walled carbon nanotubes, but also in interstices between adjacent multi-walled carbon nanotubes.

* * * * *